United States Patent [19]
Mankovitz

[11] Patent Number: 5,159,191
[45] Date of Patent: Oct. 27, 1992

[54] APPARATUS AND METHOD FOR USING AMBIENT LIGHT TO CONTROL ELECTRONIC APPARATUS

[76] Inventor: Roy J. Mankovitz, 18842 Kilfinan St., Northridge, Calif. 91326

[21] Appl. No.: 619,714
[22] Filed: Nov. 29, 1990
[51] Int. Cl.⁵ ............................................. G01D 5/34
[52] U.S. Cl. ................................................... 250/229
[58] Field of Search ............... 250/221, 229, 239, 551; 340/31

[56] References Cited

U.S. PATENT DOCUMENTS

| | | | |
|---|---|---|---|
| 4,329,581 | 5/1982 | Helfrich et al. | 250/221 |
| 4,876,446 | 10/1989 | Kambe et al. | 250/229 |
| 4,937,443 | 6/1990 | Smoot | 250/221 |

Primary Examiner—David C. Nelms
Attorney, Agent, or Firm—Roy J. Mankovitz

[57] ABSTRACT

A broadcast receiver is disclosed which is powered by a solar cell in combination with a rechargeable battery mounted within a waterproof housing which is adapted for attachment to a lounge chair used for suntanning. The control of power, tuning and volume functions is accomplished using photodetectors mounted within and adjacent transparent areas of the housing. User operated shutters mounted external to the housing shield selective photodetectors from ambient light. A separate data entry shutter is used to enable memory circuits which store control signals corresponding to the shielded photodetectors. The stored control signals are used to control the operating functions of the receiver. Audio signals are inductively coupled through the housing to external headphones.

23 Claims, 4 Drawing Sheets

APPARATUS AND METHOD FOR USING AMBIENT LIGHT TO CONTROL ELECTRONIC APPARATUS

BACKGROUND OF THE INVENTION

This invention relates to portable electronic apparatus and, more particularly, to waterproof electronic apparatus for continuous outdoor use.

In recent years, a variety of portable electronic devices have been designed for personal use by an individual while engaged in some form of physical activity. Examples of such devices include broadcast receivers, cassette tape and compact disc players. These devices are battery operated and employ headphones as sound transducers, and include a variety of attachment configurations such as belt clips and headstraps to permit the device to be attached to the user. One of the most successful brands of such devices is the Walkman series, manufactured by Sony Corporation, Toyko, Japan.

Because these portable devices are used outdoors and during exercising, a variety of "water resistant" versions have been developed to increase device reliability in a moist environment. These water resistant versions employ resilient seals formed of a material such as Neoprene to cover the openings surrounding the operating controls, battery compartment and headphone jack. While this type of design provides some degree of protection from moisture, it does not enable the device to be used on a continuous basis in an unsheltered outdoor environment. For operation in such an environment, the device should be waterproof, i.e. designed to operate continuously when totally submerged.

Accordingly, it is an object of the present invention to provide a waterproof electronic device which is inexpensive to produce and which can operate continuously in an unsheltered outdoor environment.

SUMMARY OF THE INVENTION

The foregoing and other objects of the invention are accomplished by providing electronic apparatus for use in an environment which is at least occasionally illuminated by ambient light. The apparatus includes a waterproof housing having a first area which is transparent to the ambient light, and a photodetector is located within the housing adjacent the first transparent area to respond to ambient light transmitted therethrough.

A user operated shutter is provided for controlling an operating function of the apparatus. The shutter is located external to the housing for controlling the amount of ambient light transmitted through the first transparent area. Control circuits responsive to the photodetector provide the operating function. Power for operating the internal circuitry is provided by a solar cell array, which is also used to charge a rechargeable battery. Audio signals produced by the circuitry are inductively coupled through the housing to external headphones.

The housing also includes a second area transparent to ambient light, a second photodetector is mounted adjacent the second transparent area, and each photodetector provides a control signal in response to the amount of ambient light impinging thereon. A second shutter is provided for data entry by controlling the amount of ambient light transmitted through the second transparent area. The control circuits include a memory device responsive to the control signal from the second photodetector for storing the control signal from the first photodetector.

In one embodiment of the invention, the apparatus is in the form of a broadcast receiver, and combinations of shutters and photodetectors are used to provide tuning and volume control functions, as well as to control application of power. The housing is provided with a clamp for removable attachment of the receiver to furniture employed by the user during periods of exposure to the sun.

Other objects, features and advantages of the invention will become obvious from a reading of the specification in conjunction with the drawings, in which like reference designators refer to like elements throughout the several views.

DESCRIPTION OF THE PREFERRED EMBODIMENTS

Figure 1:
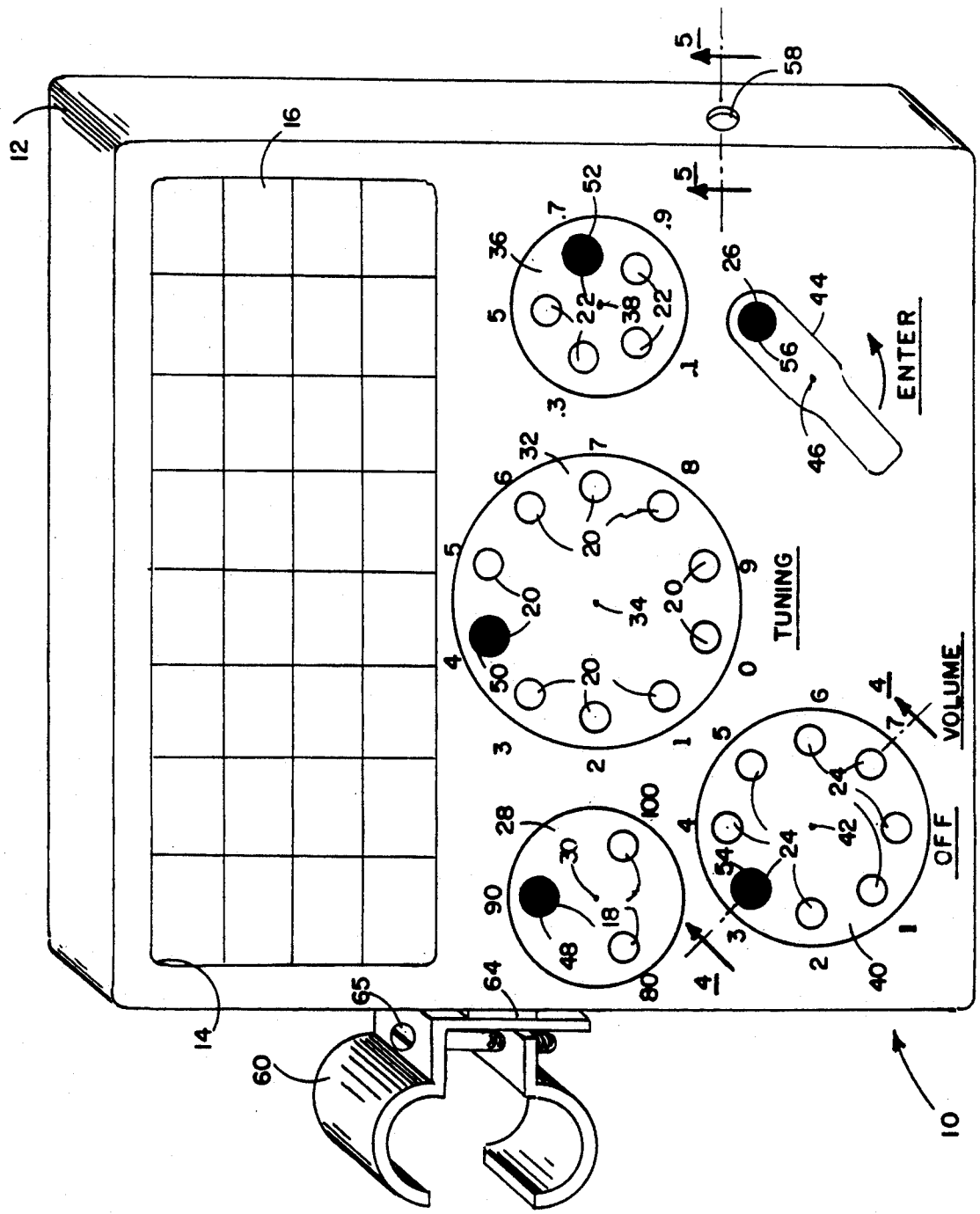
FIG. 1 is a perspective view of an FM broadcast receiver constructed in accordance with the teachings of the invention.

FIG. 1 is a perspective view of an FM broadcast receiver 10 constructed in accordance with the teachings of the invention. While the invention will be described using an FM broadcast receiver as an example, the invention is by no means limited to such use, and is equally applicable to other types of electronic apparatus, such as cassette tape and compact disc players.

Referring to FIG. 1, the receiver 10 is enclosed in a sealed housing 12 which may be formed of a plastic material such as styrene and the like. As described below, the housing 12 does not have any openings leading to the inside thereof, and can therefore be submerged in water while protecting its contents therefrom. The front surface of the housing 12 includes a transparent area 14 which may be formed by, for example, solvent bonding or sonic welding a transparent plastic window in an aperture formed in the housing 12, whereby the interface between the window 14 and the housing 12 forms a watertight seal.

Mounted within the housing 12 adjacent the area 14 is a solar cell array 16 which is used to supply power to circuits within the housing. Additional transparent areas are formed in the front surface of the housing 12 as follows. A group of three transparent areas 18 are formed in a first circular pattern, a group of ten transparent areas 20 are formed in a second circular pattern, a group of five transparent areas 22 are formed in a third circular pattern, a group of eight transparent areas 24 are formed in a third circular pattern, and a single transparent area 26 is also provided. All of these transparent areas may be formed in a manner similar to that described for the area 14.

User operated rotatable transparent circular shutters are mounted on the exterior of the front surface of the housing 12 in the following positions. A shutter 28 is mounted about an axle 30 over the transparent areas 18, a shutter 32 is mounted about an axle 34 over the areas 20, a shutter 36 is mounted about an axle 38 over the areas 22, and a shutter 40 is mounted about an axle 42 over the areas 24. A generally rectangular transparent shutter 44 is pivotably mounted about an axle 46 over the transparent area 26.

Each of the transparent shutters 28, 32, 36, 40, 44 includes an opaque area 48, 50, 52, 54, 56, respectively, which is used to shield one of the underlying transparent areas from ambient light. The particular area so shielded is selected by user rotation of the shutter. A suitable detent arrangement is provided so that the opaque area of each shutter is held in position over a particular transparent area. The shutter 44 is spring biased to the position shown where the opaque area 56 covers the transparent area 26. By pivoting the shutter 44 in the direction of the arrow marked ENTER, the user momentarily exposes the area 26 to ambient light. Releasing the shutter 44 causes it to return to the position shown.

The shutter 40 is used to apply and remove power to receiver circuitry within the housing and to select the desired volume level of audio signals furnished to external headphones. The shutters 28, 32, and 36 are used to tune the receiver circuitry to the desired broadcast station. In the United States, the FM broadcast band extends from 88 to 108 megahertz (Mhz), with the stations spaced apart at odd tenths of a Mhz. The shutter 28 selects between the 80, 90 or 100 Mhz range, the shutter 32 selects between the 1 through 9 Mhz range, and the shutter 36 selects between the 0.1 through 0.9 Mhz range.

The surface of the housing 12 is inscribed with suitable legends adjacent each transparent area indicating the frequency corresponding to that area. The desired frequency is selected by positioning the opaque area over the transparent area corresponding to that frequency. In the positions shown in FIG. 1, the receiver is tuned to 94.7 Mhz, and the volume is set to level 3. The transparent area 24 positioned at the bottom of that group and labeled OFF is used to remove power from the receiver circuitry when the opaque area 54 is rotated to that position.

From the above discussion, it may be seen that the shutters 28, 32, 36, and 40 act as user programming devices to apply power, adjust volume and tune the receiver. The opaque areas serve as visual indicators which provide a digital display of the programming. The shutter positions are converted into electrical data signals as described below to perform the desired operations, using photodetectors mounted within the housing adjacent each of the transparent areas associated with a shutter. These electrical signals are not acted upon, however, until the shutter 44 is actuated. The shutter 44 acts as a data entry key, whereby the momentary uncovering of the transparent area 26 causes circuits in the housing 12 to store the programmed data, which is then used to control the receiver.

Figure 2:
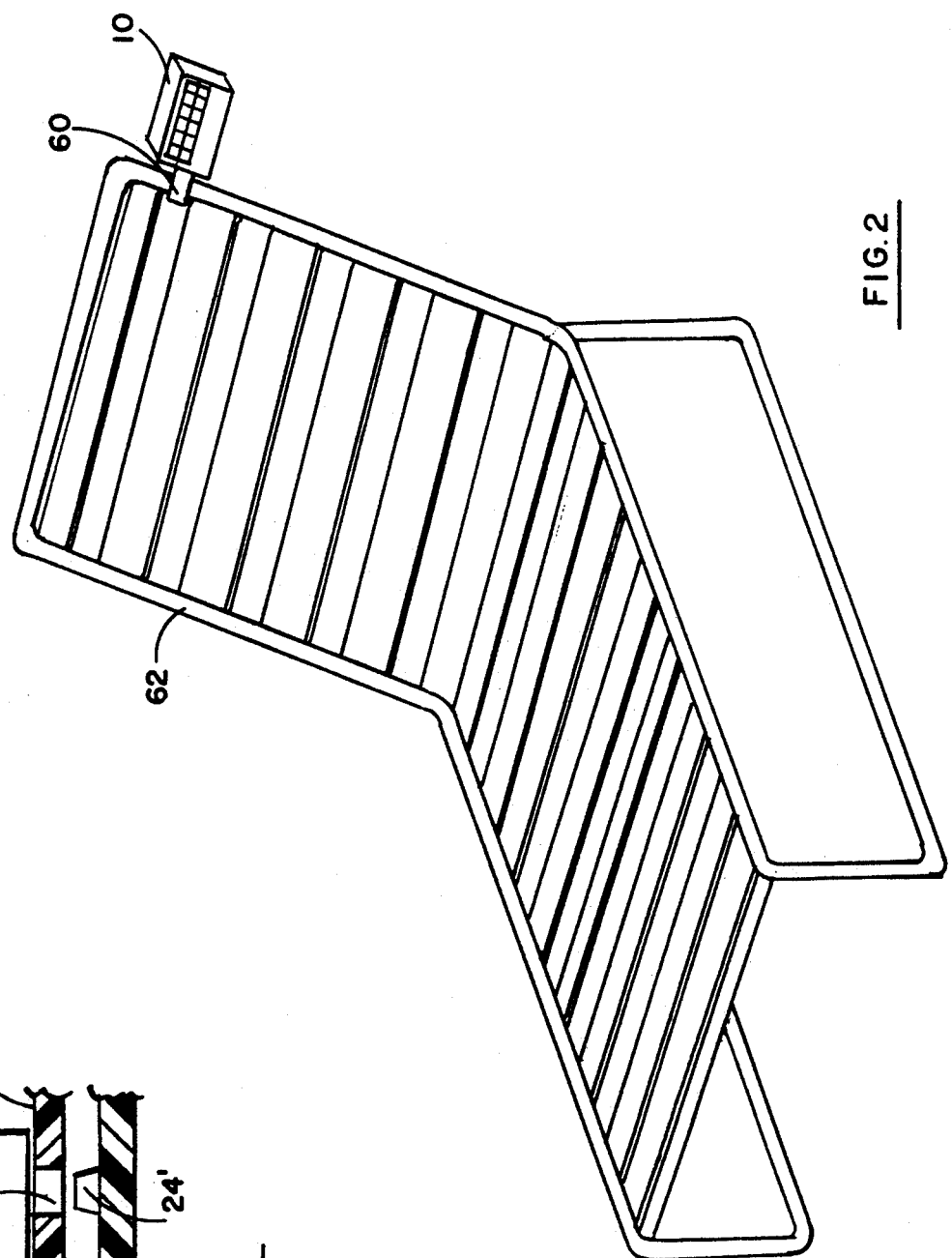
FIG. 2 is a perspective view showing the receiver of FIG. 1 mounted to a lounge chair used for suntanning.

The housing 12 also includes a blind opening 58 used to inductively couple audio signals to external headphones. A clamp 60 is rotatably mounted to the exterior of one side of the housing 12 and is used to removably attach the receiver 10 to furniture employed by the user during periods of exposure to the sun. As shown in FIG. 2, the unit 10 may thus be fastened to the frame of a suntanning lounge chair 62, using the clamp 60.

A rotatable joint 64 enables the unit to be rotated toward the sun. An advantage of this arrangement is that it makes use of the fact that the user, during suntanning, periodically moves the chair 62 to follow the progress of the sun. This operation acts to keep the solar cell array 16 pointed to the sun to obtain near maximum solar energy. It also ensures a source of illumination for operation of the photodetectors described below. While the clamp 60 shown employs a screw 65 to provide the clamping action of the jaws, this can also be accomplished using a clamp having spring biased jaws. Further, the rotatable joint 64 can be replaced by a ball joint to give additional degrees of rotational freedom. It should be noted that the clamp 60 is mounted to the external surface of the housing 12 and does not require any openings into the housing interior.

Figure 3:
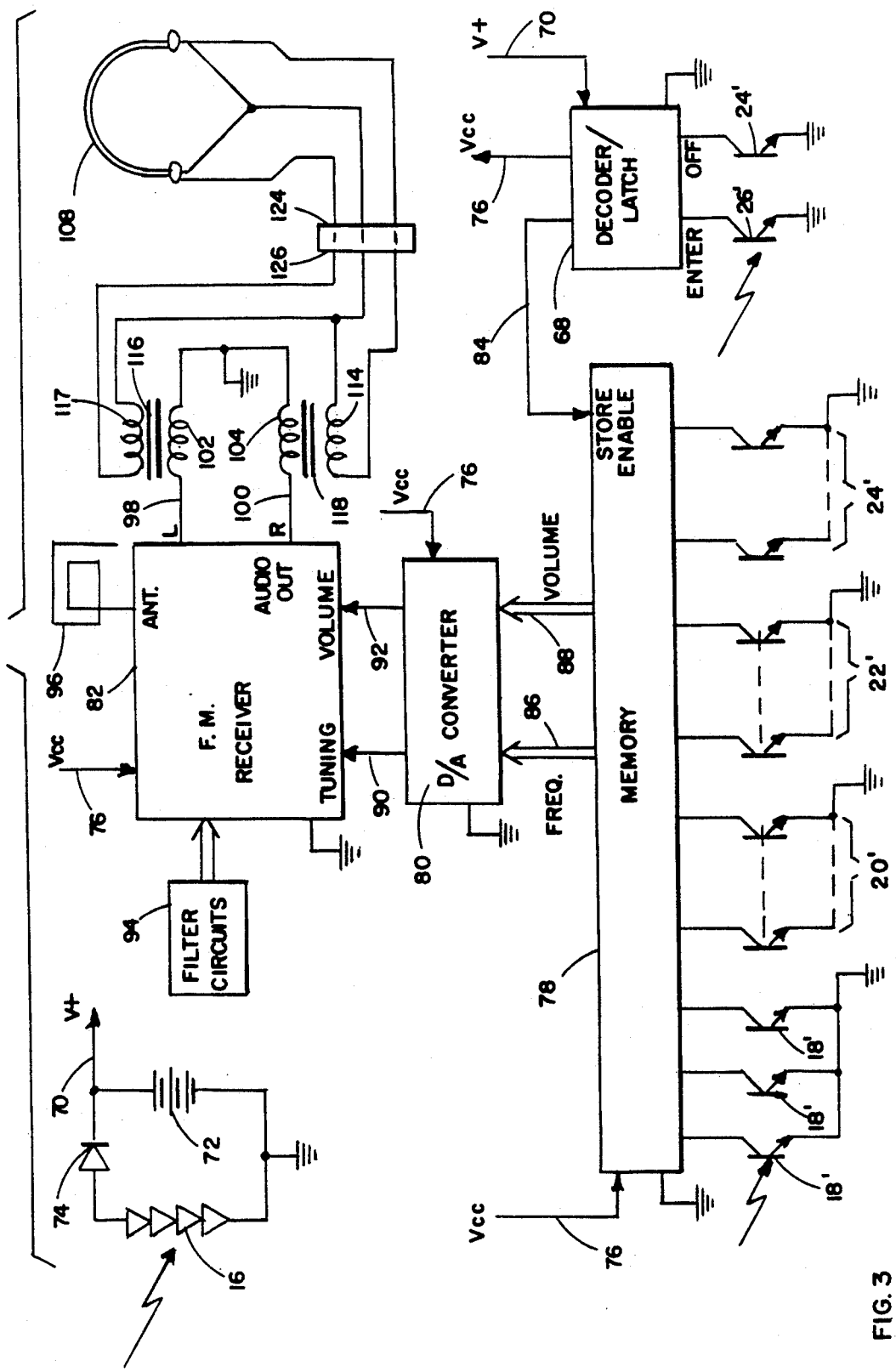
FIG. 3 is a schematic block diagram showing the circuitry used in the construction of the receiver of FIG. 1.

Referring now to FIG. 3, there is shown a functional block diagram of the circuitry employed in the operation of the unit 10. The photodetectors referenced above are preferably in the form of phototransistors and are indicated using primed reference designators corresponding to the transparent areas with which they are associated. For example, the phototransistor 26' corresponds to the phototransistor mounted adjacent the transparent area 26, and the phototransistors 18' are those mounted adjacent the transparent areas 18 in FIG. 1.

Figure 4:
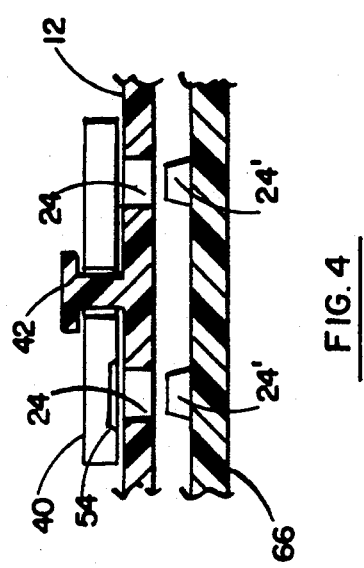
FIG. 4 is a cross-sectional view taken along the line 4—4 of FIG. 1, showing the details of construction of the photodetectors and light shutter used in the operation of the receiver of FIG. 1.

FIG. 4 is a cross-sectional view taken along the line 4—4 of FIG. 1, showing the placement of typical phototransistors 24' underneath corresponding transparent areas 24 in the housing 12. The phototransistors are mounted on a suitable circuit board 66 whereby ambient light entering the housing 12 through the transparent areas illuminates the corresponding phototransistor. The shutter 40 is shown mounted about the axle 42 which may be formed as an integral part of the housing 12. The opaque area 54 may be in the form of a blackened area on the bottom surface of the shutter 40 positioned to shield a phototransistor from ambient light.

Returning to FIG. 3, the phototransistors 26' and 24' corresponding to the ENTER and OFF functions are connected to a decoder/latch circuit 68. This circuit 68 receives operating power on line 70 from a rechargeable battery 72 which is in turn connected to solar array 16 through an isolation diode 74. The array is connected so that it charges the battery 72 in response to ambient light. The circuit 68 monitors signals from the phototransistors 26' and 24' and operates as follows. When the user rotates the shutter 40 so that the OFF position is exposed to ambient light, and then momentarily actuates the shutter 44 so that the phototransistor 26' is exposed to ambient light, the circuit 68 detects such user action in response to control signals provided by the corresponding phototransistors. In response thereto, the circuit 68 provides operating power on line 76 to the remaining circuits in the unit 10, namely a memory circuit 78, a digital to analog (D/A) converter 80 and FM receiver circuits 82. This operating power is maintained to said circuits until the user rotates the shutter 40 to cover the OFF position, and again operates the ENTER shutter 44 in the presence of ambient light. In such instance, power is removed from the line 76.

Each time the user operates the ENTER shutter 44, the circuit 68 also provides a momentary enable signal on line 84 to memory 78, causing that circuit to store signals provided from phototransistors 18', 20', 22', and 24'. Phototransistors respond to ambient light incident thereon by switching from a non-conducting state to a conducting state, detectable by circuits 68 and 78. The high gain associated with such devices enables them to respond in this manner to extremely low levels of ambient light, including incident indoor natural or artificial room light. The memory 78 thus stores signals representing the position of the shutters 28, 32, 36, and 40, corresponding to tuning and volume data.

The signals stored in the memory circuits 78 are provided in digital form to D/A converter 80 on lines 86 and 88. The signals on the line 86 correspond to the data received and stored from the phototransistors 18', 20; and 22', and thus represent tuning frequency, while the signals on the line 88 correspond to the data receives and stored from the phototransistors 24', and thus represent audio signal volume. The converter 80 converts these digital signals to corresponding analog frequency and volume signals which are provided on lines 90 and 92 to the FM receiver circuits 82. The circuits 82 are preferably constructed in the form of one or more low voltage, low power integrated circuits which, in conjunction with a variety of filter circuits 94 perform the functions of receiving, amplifying, detecting, and demodulating FM stereo broadcast signals from a suitable antenna 96. The antenna 96 may be in the form of a small loop mounted within the housing 12 or, alternatively, may be suitably, RF coupled to external headphones described below to enable the wiring associated with these headphones to act as an external antenna.

Figure 5:
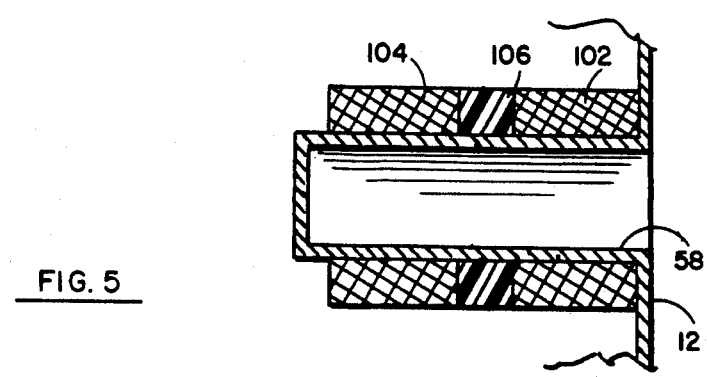
FIG. 5 is a cross-sectional view taken along the line 5—5 of FIG. 1, showing the construction of the induction coils used for coupling stereo headphones to the receiver of FIG. 1.
Figure 6:
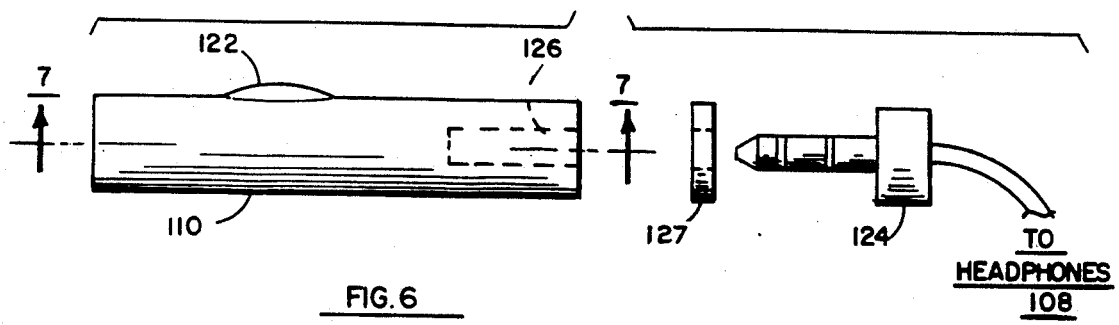
FIG. 6 is a side view of an adaptor for connecting conventional stereo headphones to the receiver of FIG. 1.
Figure 7:
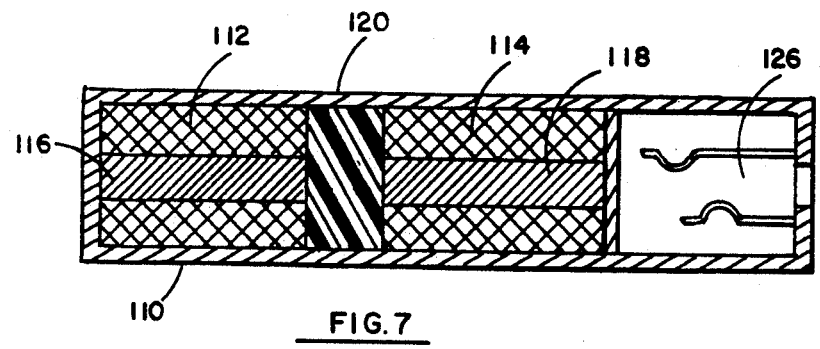
FIG. 7 is a cross-sectional view taken along the line 7—7 of FIG. 6, showing the details of construction of the adaptor of FIG. 6.

An example of FM circuits suitable for use in the unit 10 may be found in the portable stereo FM radio sold by the Radio Shack division of Tandy Corporation, Fort Worth, Texas as model number 12-138. This radio operates from a single 1.5 volt battery and draws approximately 15 milliamperes during operation. Audio output signals suitable for operating stereo headphones are provided on line 98 and 100. These left and right channel audio signals are coupled, respectively, to coils 102 and 104 which surround the blind opening 58 of the housing 12, as shown in FIG. 5, which is a cross-sectional view taken along the line 5—5 of FIG. 1. The coils 102 and 104 are physically separated along the length of the opening 58 by using, for example, a suitable non magnetic spacer 106.

The audio signals generated in the coils 102 and 104 are inductively coupled through the housing 12 to stereo headphones 108 using an adapter 110 designed to be removably retained within the opening 58. The adapter 110 is generally tubular in shape and includes two coils 112 and 114 which are wound around corresponding magnetic cores 116 and 118 and are spaced apart by an insulator 120 within a suitable plastic housing. A retainer 122, which may be in the form of a flexible projection extending from the adapter 110 is provided to hold the adapter 110 in place when it is inserted in the opening 58. When so inserted, the coils 112 and 114 cooperate with the coils 104 and 102 and the cores 116 and 118 to form two transformers which act to inductively couple the audio signals to the coils 112 and 114.

The adapter 110 is constructed to allow connection to conventional headphones the cord of which terminates in a typical three-conductor ⅛ inch stereo plug 124. This connection is accomplished by including a mating three-conductor jack 126 which is mounted within the adapter housing and is wired to the coils 112 and 114 as shown in FIG. 3. The adapter 110 is designed to be removed from the unit 10 when not in use. A resilient washer 127 may be employed to act as a moisture seal for the plug/jack interface when in use. Alternatively, the adapter may be constructed to be totally waterproof by permanently connecting it to the headphone cord and sealing the connection with epoxy, silicone, or the like. The antenna 96 may be RF coupled to one of the coils 102, 104 to make use of the headphone cord as an external antenna.

The operation of the unit 10 described above is as follows. The unit is preferably mounted to a lounge chair employed by the user for suntanning, and may be left outdoors indefinitely. Exposure to the sun causes the solar array 16 to generate electrical power which charges the battery 72 through isolation diode 74, the purpose of which is to prevent the battery 72, which is preferably of the sealed nickel-cadmium type, from discharging through the array 16 during periods of darkness.

It has been found that the circuits within the housing 12 can be fabricated to operate from a nominal 1.5 volt source with a total current drain of about 20 milliamperes. The battery 72 is preferably a commercially available AAA size NiCad battery which generates 1.25 volts and has an electrical storage capacity of 300 milliampere-hours. The solar array 16 is configured to supply 2.2 volts at a nominal 70 milliamperes, and may be constructed using two Radio Shack type 276-113 solar cells connected in series.

When the unit 10 is placed in the power on mode, the solar array is capable of simultaneously operating the circuits in the unit 10 and charging the battery 72. In this mode, the battery 72 is fully charged in a period of about 6 hours of exposure of the array 16 to the sun. A fully charged battery is capable of continuously powering the unit 10 for 15 hours in the absence of solar energy. With the unit 10 in the power off mode, the only circuits in operation are the circuits 68, which can be configured to draw about one milliampere of current. In this mode, the array 16 is capable of fully charging the battery 72 in about 4.5 hours of solar exposure.

The user places the unit 10 in a power on mode by rotating the shutter 40 from the OFF position to the desired volume setting, rotating the shutters 28, 32, and 36 to the desired broadcast station frequency, and actuating the ENTER shutter 44. These operations cause the circuits 68 to apply power to the remaining circuits, and cause the memory 78 to store the volume and tuning data, which is provided to the receiver circuits 82. Audio signals are coupled to the headphone 108. To change volume or tuning settings, the user rotates the applicable shutters, and again operates the ENTER shutter. The new settings are then stored and used to operate the receiver. The unit is placed in the power off mode by rotating the shutter 40 to cover the OFF position, and actuating the ENTER shutter.

The use of the ENTER shutter prevents the unit 10 from responding to false signals which may occur when the unit 10 is temporarily obscured from ambient light. This may occur, for example, as a result of the user's hand obscuring one or more of the transparent areas when changing settings, or by shadows cast on the surface of the housing 12. The ENTER function also allows the unit to be used during periods of total darkness, since the memory 78 retains the data settings and the unit remains powered by the battery 72. Thus, the unit 10 can be used indoors or in total darkness. Only a momentary exposure to a low level of ambient light is necessary for the unit to respond to new user settings. Note that in an environment of total darkness, the unit will not respond to actuations of the ENTER shutter, since no signal will be detected by the phototransistors 26'. Hence, the unit 10 will continue to operate in response to the last set of user settings.

From the above description, it may be seen that the housing 12 is totally waterproof, and hence the unit 10 can be left in an unprotected outdoor environment indefinitely without damage. Further, the unit can be operated underwater. One particular use for the unit 10 is in connection with lounge chairs provided by hotels and resorts in connection with their swimming pool or beach area. In this instance, each of the lounge chairs would be equipped with a unit 10 attached thereto. Hotel guests may then have access to a stereo FM receiver for use with their headphones, and the hotel need not be concerned with battery replacement of the need to move the units from an outdoor environment. In one embodiment, the hotel would rent the use of the unit to a guest on a daily basis for a fee. This may be accomplished by using a coding technique to apply power to the unit to prevent unauthorized use. The pool attendant would be furnished with a "key" which is used in conjunction with the coding technique to activate those units which have been rented.

Figure 8:
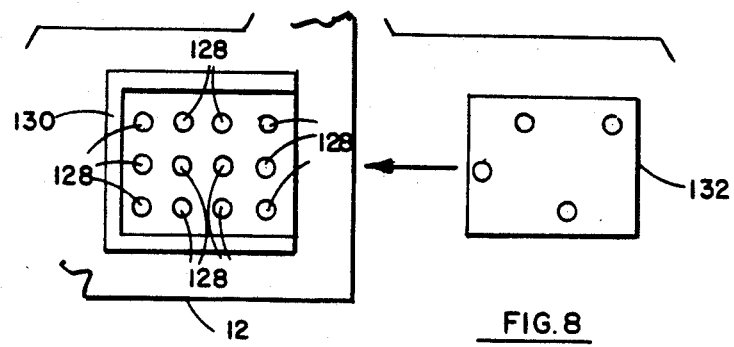
FIG. 8 is a fragmentary view of a portion of the front of the receiver of FIG. 1, showing an alternate embodiment of a group of photodetectors and a code key used to control the application of power to the receiver of FIG. 1.

One method of encoding the power on function is shown in FIG. 8. In this instance, the OFF function provided by the photocell 24' associated with the OFF position is replaced with a separate group of phototransistors 128 arranged as an array beneath suitable transparent areas on the surface of the housing 12 and within a frame 130 provided thereon. Signals from the phototransistors 128 are provided to the decoder/latch circuits 68, which are configured to apply power to the receiver circuits when only a predetermined pattern of phototransistors are shielded from ambient light.

The pool attendant is equipped with a key in the form of a transparent card 132 which fits over the transparent areas within the frame 130, and contains opaque areas which mask the phototransistors 128 in the predetermined pattern. With the key thus inserted, actuation of the ENTER shutter applies power to the receiver circuits, at which time the key may be removed and the unit 10 operated as described above.

The power off mode may be modified from that described above, whereby when the phototransistors 128 sense a total absence of light, the circuits 68 remove power from the receiver circuits without the need to actuate the ENTER shutter. With this configuration, the rented units will automatically shut off at the end of the day, and remain off until reset by the attendant. Thus, an automatic rental period of one day is established without attendant intervention.

It will be apparent to those skilled in the art that the preceding descriptions of embodiments of the invention may be substantially varied to meet particular requirements without departing from the true spirit and scope of the invention disclosed. For example, while the shutter mechanism described above employs one opaque area in a transparent shutter to distinguish the shutter position, it is envisioned that a reverse configuration can be used in which the shutter is substantially opaque, with only a single transparent area used to distinguish shutter position. Therefore, the embodiments described are not to be taken as indicative of the limits of the invention but rather are exemplary structures of the invention which is defined by the claims appended hereto.

What is claimed is:

1. Electronic apparatus for use in an environment which is at least occasionally illuminated by ambient light, comprising:
   a housing having a first area and a second area, each transparent to ambient light;
   light responsive means located within the housing and including first and second photodetectors adjacent the first and second transparent areas, respectively, each photodetector providing a control signal in response to the amount of ambient light impinging thereon;
   user operated input means for controlling an operating function of the apparatus, including shutter means for controlling the amount of ambient light transmitted through the first and second transparent areas; and
   control means responsive to the light responsive means for providing the operating function, including memory means responsive to the control signal from the second photodetector for storing the control signal from the first photodetector.

2. The apparatus of claim 1 where the operating function to be controlled is the application of power from a power source to circuits within the housing, and in which the stored control signal from the first photodetector acts to control the application of power from the power source to the circuits within the housing.

3. The apparatus of claim 2 in which the source of power includes a solar cell mounted within the housing.

4. The apparatus of claim 1 in which the housing is waterproof.

5. The apparatus of claim 2 in which the circuits produce an audio signal, and further including audio coupling means for inductively coupling the audio signal through the housing to a sound transducer external to the housing.

6. The apparatus of claim 5 in which the audio coupling means includes a first coil mounted within and adjacent a portion of the housing and connected to receive the audio signal, and a second coil external to the housing, operatively connected to the sound transducer, and adapted to be removably retained to the housing adjacent the first coil, whereby the audio signal is inductively coupled from the first coil to the second coil when the second coil is thus retained.

7. The apparatus of claim 6 in which the sound transducer is removably connected to the second coil.

8. The apparatus of claim 1 in which the housing includes attachment means for removable attachment of the housing to furniture employed by the user during periods of exposure to the sun.

9. The receiver of claim 1 in which the housing includes a third area transparent to ambient light, the light responsive means includes a third photodetector adjacent the third transparent area for providing a control signal in response to the amount of ambient light impinging thereon, the shutter means includes means for controlling the amount of ambient light transmitted through the third transparent area, and the memory means is responsive to the control signal from the second photodetector for storing the control signal from the third photodetector.

10. The apparatus of claim 9 in which the stored control signal from the third photodetector is used to control the turning of broadcast receiver circuits within the housing.

11. The receiver of claim 10 in which the housing includes a fourth area transparent to ambient light, the light responsive means includes a fourth photodetector adjacent the fourth transparent area for providing a control signal in repsonse to the amount of ambient light impinging thereon, the shutter means includes means for controlling the amount of ambient light transmitted through the fourth transparent area, and the memory means is responsive to the control signal from the second photodetector for storing the control signal from the fourth photodetector.

12. The apparatus of claim 11 in which the receiver circuits produce an audio signal, and the stored control signal from the fourth photodetector is used to control the amplitude of the audio signal.

13. The apparatus of claim 1 in which the shutter means for controlling the amount of ambient light transmitted through the second transparent area includes a shutter which is biased to a position which excludes substantially all of the ambient light from impinging on the second photodetector, and the memory means stores the control signal from the first photodetector in response to the user operation of the shutter from its bias position to a position which allows ambient light to impinge on the second photodetector.

14. The apparatus of claim 1 in which the memory means stores the control signal from the first photodetector when the control signal from the second photodetector indicates an increase in the amount of ambient light impinging thereon.

15. The apparatus of claim 1 in which the operating function of the apparatus is controlled in response to the stored control signal from the first photodetector.

16. A broadcast receiver for use in an environment which is at least occasionally illuminated by ambient light, comprising:
a housing having a first group of multiple areas and a second area all of which are transparent to the ambient light;
light responsive means including photodetectors located within the housing adjacent the transparent areas to respond to ambient light transmitted therethrough, each photodetector providing a control signal in response to the amount of ambient light impinging thereon;
user operated input means for controlling an operating function of the apparatus, including a first shutter means external to the housing for controlling the amount of ambient light transmitted through the first group of multiple transparent areas, and second shutter means for controlling the amount of ambient light transmitted through the second transparent area; and
control means responsive to the light responsive means for providing the operating function, including memory means responsive to the control signal from the photodetector adjacent the second transparent area for storing the control signals from the photodetectors adjacent the first group of multiple transparent areas, and for providing the operating function if the control signals from the photodetectors adjacent the first group of multiple transparent areas conform to a predetermined pattern of control signals.

17. Electronic apparatus for use in an environment which is at least occasionally illuminated by ambient light, comprising:
a housing having a first group of multiple areas and a second area all of which are transparent to the ambient light;
light responsive means including photodetectors located within the housing adjacent the transparent areas to respond to ambient light transmitted therethrough, each photodetector providing a control signal in response to the amount of ambient light impinging thereon;
user operated input means for controlling an operating function of the apparatus, including first shutter means external to the housing for controlling the amount of ambient light transmitted through the first group of multiple transparent areas, and second shutter means for controlling the amount of ambient light transmitted through the second transparent area; and
control means responsive to the light responsive means for providing the operating function, including memory means responsive to the control signal from the photodetector adjacent the second transparent area for storing at least some of the control signals from the photodetectors adjacent the first group of multiple transparent areas, whereby the operating function is provided in response to the stored control signals.

18. A system for using ambient light to perform an operating function of electronic apparatus, comprising:
first light responsive means for providing a first control signal having a characteristic which is responsive to the amount of ambient light impinging thereon;
second light responsive means for providing a second control signal having a characteristic which is responsive to the amount of ambient light impinging thereon;
programming means for controlling the amount of light impinging on the first light responsive means to produce a function characteristic of the first control signal which represents the operating function to be performed;
execution means for controlling the amount of light impinging on the second light responsive means to produce a command characteristic of the second control signal representing a command to perform the operating function; and
control means responsive to the command characteristic of the second control signal for performing the operating function represented by the function characteristic of the first control signal.

19. The system of claim 18 where the control means stores a representation of the function characteristic in response to the command characteristic.

20. The system of claim 18 where the command characteristic is one which is indicative of an increase in the amount of ambient light impinging on the second light responsive means.

21. A method for using ambient light to perform an operating function of electronic apparatus, comprising the steps of:
- providing a first control signal having a characteristic which is responsive to the amount of ambient impinging on a first light responsive means;
- providing a second control signal having a characteristic which is responsive to the amount of ambient impinging on a second light responsive means;
- controlling the amount of light impinging on the first light responsive means to produce a function characteristic of first control signal representing the operating function to be performed;
- controlling the amount of light impinging on the second light responsive means to produce a command characteristic of the second control signal representing a command to perform the operating function; and
- performing the operating function represented by the function characteristic of the first control signal in response to the command characteristic of the second control signal.

22. The method of claim 21 further including the step of storing a representation of the function characteristic in response to the command characteristic.

23. The method of claim 21 where the command characteristic is one which is indicative of an increase in the amount of light impinging on the second light responsive means.